United States Patent [19]

Kieninger

[11] Patent Number: 4,692,069
[45] Date of Patent: Sep. 8, 1987

[54] CUTTER HEAD

[75] Inventor: Walter Kieninger, Lahr, Fed. Rep. of Germany

[73] Assignee: Walter Kieninger GmbH, Diamantwerkzeugfabrik, Fed. Rep. of Germany

[21] Appl. No.: 798,390

[22] Filed: Nov. 15, 1985

[30] Foreign Application Priority Data

Nov. 15, 1984 [DE] Fed. Rep. of Germany ....... 3441821

[51] Int. Cl.⁴ .............................................. B23C 5/24
[52] U.S. Cl. .................................. 407/39; 82/DIG. 8;
407/41; 407/46; 407/89; 408/159; 408/161; 408/179; 408/180
[58] Field of Search ................................... 407/36–41,
407/44–47, 49, 52, 81, 83, 84, 89, 90, 120;
408/159, 161–172, 179, 180, 187; 74/573;
82/DIG. 8

[56] References Cited

U.S. PATENT DOCUMENTS

| | | | |
|---|---|---|---|
| 2,430,844 | 11/1947 | Colwell | 407/85 |
| 2,861,471 | 11/1958 | Kronenberg | 82/DIG. 8 |
| 3,371,397 | 3/1968 | Coleshill et al. | 407/89 |
| 3,736,811 | 6/1973 | Neary | 74/573 |
| 3,755,868 | 9/1973 | LaForge et al. | 407/120 |
| 3,839,772 | 10/1974 | Shimomura et al. | 407/46 |
| 4,311,418 | 1/1982 | Erkfritz et al. | 407/39 |
| 4,470,731 | 9/1984 | Erkfritz | 407/46 |
| 4,474,512 | 10/1984 | Lindlar et al. | 407/39 |
| 4,627,771 | 12/1986 | Kieninger | 407/39 |

FOREIGN PATENT DOCUMENTS

600977  6/1978  Switzerland .......................... 407/89

Primary Examiner—Nicholas P. Godici
Assistant Examiner—Jerry Kearns
Attorney, Agent, or Firm—Arnold, White & Durkee

[57] ABSTRACT

The invention relates to a cutter head having a substantially cylindrical main body and a plurality of replaceably cutting elements disposed at the periphery of said main body and having at least one cutting edge in the axial and/or radial direction of said main body. For achieving a reliable three-dimensional adjustment of the cutting members within extremely close tolerances, each cutting member is mounted on a carrier member itself mounted on said main body and adapted to be radially and axially adjusted relative to the main body by means of separate adjustment means disposed between said main body and said carrier member, and to be fixed relative to said main body with the aid of clamping means.

12 Claims, 12 Drawing Figures

CUTTER HEAD

Applicant is the inventor of the invention of U.S. Pat. No. 4,627,771 which issued on Dec. 9, 1986 and relates to a milling tool.

The present invention relates to a cutter head having a substantially cylindrical main body and a plurality of replaceable cutting members disposed at the periphery of said main body and having at least one cutting edge extending in the axial and/or radial direction of said main body.

In a cutter head of this type, which is mainly used as a milling tool in the field of mechanical engineering, it is essential that the cutting members, or the cutting edges thereof, respectively, be adjustable relative to the main body of the cutter head. The adjustment has to be carried out with the highest precision, care having to be taken that the position of the cutting members relative to the main body remains unchanged during operation of the cutter head.

It is an object of the invention to provide a cutter head of the type defined above which permits the cutting members to be accurately adjusted in three dimensions relative to the main body while offering the advantages of high safety and reliability and being readily operable.

To attain this object, the invention provides that each cutting member is mounted on a carrier member secured to the main body and adapted to be radially and axially adjusted with respect to the main body by means of separate adjustment means disposed between the main body and each carrier member, and to be fixed in position on said main body with the aid of clamping means.

The cutter head according to the invention is characterized by several considerable advantages. The mounting of the cutter member on a carrier member, itself mounted on the main body of the cutter head, permits the employ of a very small cutting member, since the functional components required for its adjustment are associated not with the cutting member, but with the carrier member. In the employ particularly of high-duty and highly wear resistant cutting bodies, the size and the volume of the cutting bodies are of decisive importance with regard to production and processing costs. With the cutter head according to the invention it is therefore possible to employ cutting members of very small dimensions. The carrier member is radially and axially adjustable with respect to the main body by means of separate adjustment means, so that the position of the cutting edges can be adjusted in three dimensions relative to the main body. The provision of separate adjustment means ensures that the adjustment can be safely carried out even by unskilled personnel. After adjustment of the position of the cutting member, the latter may be fixed in position relative to the main body by means of separate clamping means, so as to ensure that the position of the cutting member remains unchanged during operation of the cutter head. The fixation of the cutting member by means of the separate clamping means is carried out independently of the adjustment means, so that the latter is not influenced by the clamping means.

In the cutter head according to the invention, the carrier member is advantageously mounted in a groove extending substantially radially of the axis of rotation of the main body and having substantially parallel surfaces in the radial direction. In this manner it is on the one hand ensured that the carrier member is adjustable in the axial as well as in the radial direction, while on the other hand the forces acting on the cutting member during the cutting operation and transmitted to the carrier member are safely and reliably transmitted to the main body. Thanks to this nature of the force transmission from the work-engaging cutting edge to the main body, the cutter head according to the invention offers the possibility to vary the configuration of the cutting members within a wide range, and particularly to employ various cutting and rake angles and to form the cutting edges with a suitable geometry for any given cutting operation without therefore requiring the employ of a modified construction of the main body of the cutter head. A further decisive advantage also results from the fact that in a cutter head of this type the cutting member may be made of any suitable cutting blade material, so that the cutter head can be universally employed particularly in view of future development of materials.

A particularly advantageous aspect of the cutter head according to the invention resides in the provision that each of the adjustment means is designed substantially in the form of a wedge adapted to be cooperatively associated with the carrier member at the location of the groove. Such wedge-type adjustment means are capable of being made at very reasonable cost while being characterized by a very simple and reliable operation, as the magnitude and accuracy of the adjustment may be adapted to any purpose on hand by selecting a suitable wedge angle. The location of the adjustment means in the groove or adjacent thereto results in a particularly compact construction of the cutter head, so that the main body may be equipped with the greatest possible number of cutting members. The location of the wedge-type adjustment means in the groove or adjacent thereto offers the further decisive advantage that the surfaces to be engaged by the wedges can be machined in the course of the machining of the main body and its grooves, so that an additional machining operation is not required.

In an advantageous embodiment of the cutter head, the invention provides that the axial adjustment wedge for the axial adjustment of the carrier member is disposed on the side of the carrier member opposite to the axial advance direction of the main body, and is formed with a substantially radial threaded bore in alignment with a threaded bore in the main body, and that the two threaded bores are adapted to be threadedly engaged by a differential screw for the displacement of the axial adjustment wedge. This construction of the axial adjustment means is characterized by excellent reliability and safety as well as simplicity, as the forces exerted by the axial adjustment wedge on the carrier member are directly transmitted to the main body. The employ of a differential screw permits the carrier member to be adjusted to extremely small tolerances of a magnitude of 1/1000 mm. The employ of the differential screw having threads of different pitch results in the further advantage that the adjustability of the wedge relative to the main body may be varied by suitably selecting the pitch of the threads to conform with the intended use of the cutter head. In addition, the aligned threaded bores to be engaged by the differential screw offer the advantages of extremely low manufacturing costs and a high degree of efficiency as compared to known adjustment systems.

In a particularly advantageous embodiment, the cutter head according to the invention is characterized in that the radial adjustment wedge for the radial adjustment of the carrier member is disposed on the side of the carrier member facing away from the direction of rotation of the main body and adapted to be engaged with a substantially radially facing engagement surface of the carrier member, and that adjacent the radial adjustment wedge the main body is formed with a substantially axially extending threaded bore adapted to be threadedly engaged by a headed screw, the bottom side of the head of the screw being adapted to be engaged with the radial adjustment wedge. This arrangement of the radial adjustment wedge ensures that the cutting forces acting on the carrier member, or the cutting member, respectively, are effective to bias the carrier member in the direction towards the adjustment wedge, so as to ensure a reliable cooperation between the carrier member, the radial adjustment wedge and the main body under all operating conditions. As in the case of the axial adjustment wedge, the radial adjustment wedge likewise offers the possibility to vary the adjustment gradient by suitably selecting the wedge angle so as to conform to the given operating conditions of the cutter head. The adjustment is carried out with the aid of the headed screw which is received in a threaded bore of the main body. This adjustment system of the radial adjustment wedge can be realized with very low manufacturing costs and ensures a maximum degree of reliability and safety. The cutting forces are transmitted from the cutting member via the carrier member and the radial adjustment wedge directly to the main body, while the forces to be absorbed by the headed screw are very small in this arrangement.

In a particularly advantageous embodiment of the described cutter head, the invention provides that on the side of the carrier member opposite to the radial adjustment wedge there is disposed a clamping wedge formed with a threaded bore extending therethrough in alignment with a threaded bore in the main body, the threaded bores being adapted to receive a differential screw for the displacement of the clamping wedge, and further that the carrier member is provided with a threaded recess substantially extending in a radial plane with respect to the main body and adapted to receive a follower screw for radial displacement of the carrier member by engaging the main body. The employ of an additional clamping wedge results in the advantage that the position of the carrier member relative to the main body established with the aid of the axial and radial adjustment wedges can be fixed without the radial or axial adjustment means having to be actuated to this purpose. In this manner it is easily possible to adjust the cutting member with an accuracy of a magnitude of 1/1000 mm. Since the clamping wedge is disposed on the side of the carrier member opposite the radial adjustment wedge, and the forces exerted thereby act substantially in the same direction as the circumferential forces resulting from the cutting operation, these forces are added to result in a total force opposing the force exerted by the radial wedge. In this manner it is possible to compensate a major proportion of the cutting forces acting in the circumferential direction by the cooperation of the radial adjustment wedge and the clamping wedge. This results in the advantage that the dimensions of the carrier member and the cutting member may be considerably reduced, whereby the manufacturing costs particularly of the cutting member are reduced, and a greater number of cutting members may be mounted on the periphery of the main body. The employ of the follower screw ensures that there is at any time a minimum force acting between the carrier member and the adjustment wedges, or the clamping wedge, respectively, so that the carrier member is always safely fixed in position relative to the main body even when the cutter head is not in use.

In a particularly advantageous embodiment of the cutter head according to the invention, the cutting member may be secured to the carrier member by means of a fastener screw for pivotal movement about the axis of the fastener screw at least within a certain range, such pivotal movement being adapted to be limited by means of two adjustment screws mounted in the carrier member. This pivotal mounting of the cutting member permits the latter to be pivoted about an axis extending substantially tangential with respect to the periphery of the main body, in addition to its axial and radial adjustability. This pivotal mounting is particularly advantageous in the case of standardized cutting members which have to be adjusted to particular geometric configurations.

A particularly advantageous embodiment of the cutter head according to the invention results from the provision that the cutting member is designed in the form of a cutting blade carrier carrying a cutting blade. In this case it is possible to equip the cutter head with a variety of standardized cutting blades. Such standardized cutting blades may be made of various cutting blade materials with or without special cutting inserts made for instance of polycrystalline diamond or polycrystalline boron nitride, and they may also be formed with a variety of cutting geometries and shapes. For adapting the various standardized cutting blades to the cutter head, all that is required is to employ the suitable cutting blade carried. This results in the additional advantage that the cutter head according to the invention may be used for shape cutting operations involving a highly complicated geometry.

In a further advantageous embodiment of the cutter head according to the invention, the cutting member may be formed with a bead having a radially outwards facing engagement surface and adapted to be engaged with a groove of the carrier member having a radially inwards facing engagement surface. This construction permits the cutter head according to the invention to be also employed for high speed cutting operations, as the centrifugal forces resulting from such operations are reliably absorbed by the locking engagement of the bead with the groove without altering the adjusted position of the cutting member.

According to a further advantageous aspect of the cutter head according to the invention, the main body may be formed with a peripherally extending anjular groove adapted to have at least one balancing body secured therein. This construction permits the dynamic equilibration of the cutter head required for high-speed cutting operations to be carried out in a simple manner by adjusting the position of the balancing body without therefor requiring any additional parts possibly interfering with the cutting operation.

The cutter head may advantageously be composed of a carrier carrying the cutting members, and an annular member secured to the carrier and provided with the annular groove and an arrangement of control surfaces. This construction permits the carrier itself to be manufactured in a particularly simple manner and at low cost, the formation of the grooves for receiving the carrier members and adjustment wedges being particularly facilitated. The interconnection between the carrier and the annular member may be accomplished by a press fit or by the employ of additional screws. The control surfaces formed on the annular member permit the concentric rotation of the cutter head to be verified in a particularly simple manner when the cutter head is installed in a machine tool.

Embodiments of the cutter head according to the invention shall now be described by way of example with reference to the accompanying drawings, wherein.

Figure 1:
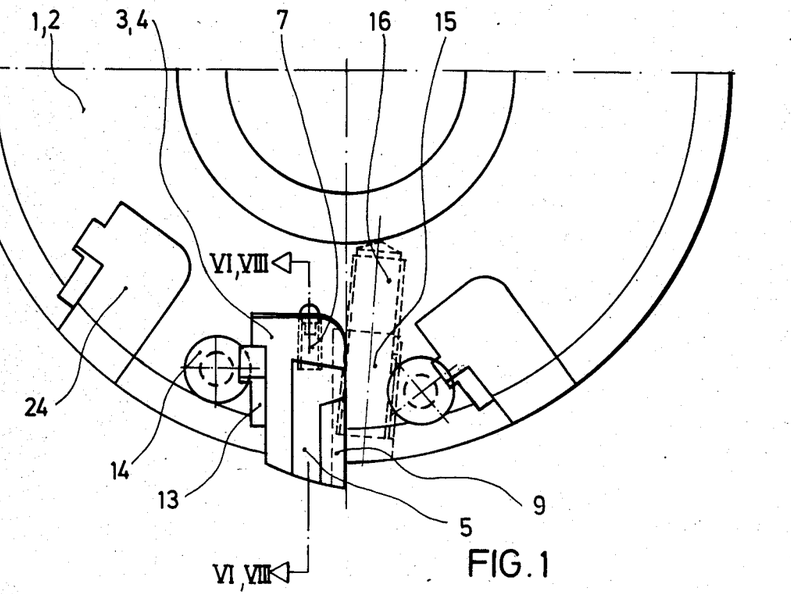
FIG. 1 shows a partially diagrammatical top plan view of a first embodiment of the cutter head.

Shown in FIG. 1 in a partially diagrammatic top plan view is a part of a cutter head in a first embodiment of the invention. The cutter head comprises a substantially cylindrical main body 1, 2 formed at its outer periphery with a plurality of substantially radially extending grooves 24 for receiving each a respective carrier member 3, 4 therein. Mounted on the carrier member is a cutting blade carrier 5 carrying a cutting blade 9. With reference to the orientation shown in FIG. 1, the cutter head rotates in the counterclockwise direction during the cutting operation. Disposed at the rear side of carrier member 3, 4 as viewed in the cutting direction is a radial adjustment wedge 13 acting between main body 1, 2 and carrier member 3,4 for radial adjustment of the latter. Adjustment of the radial adjustment wedge 13 is accomplished by means of a headed screw 14 diagrammatically indicated in top plan view. Disposed at the forward side of carrier member 3, 4 as seen in the cutting direction is a clamping wedge 15 adapted to be adjusted by means of a differential screw 16. As will be explained in detail with reference to FIG. 7, there is further provided an adjustment screw 7 for adjusting cutting blade carrier 5 relative to carrier member 3,4.

Figure 2:
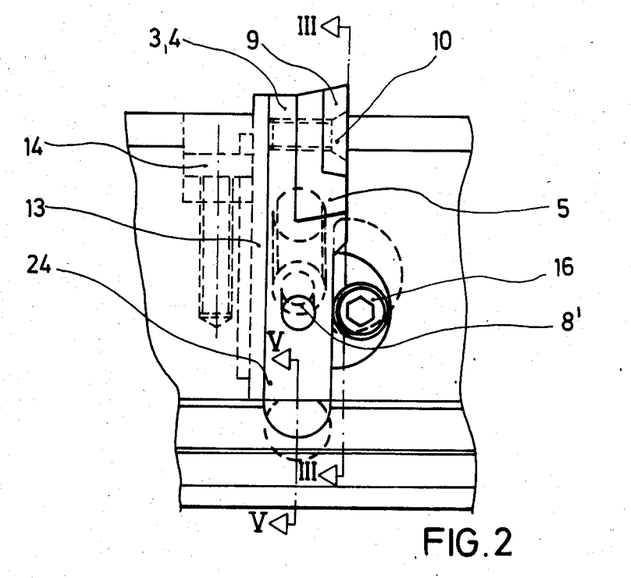
FIG. 2 shows a sideview of the cutter head of FIG. 1.

FIG. 2 shows a sideview of the first embodiment of the cutter head shown in FIG. 1. Disposed in groove 24 is carrier member 3, 4, itself carrying cutting blade carrier 5 with cutting blade 9 mounted thereon. Cutting blade 9 is secured to cutting blade carrier 5 by means of a fastening screw 10 additionally serving for securing cutting blade carrier 5 to carrier member 3,4. Headed screw 14 is received in a bore extending parallel to groove 24, its head being engaged with radial adjustment wedge 13 to be described in detail as the description proceeds. Carrier member 3, 4 is additionally formed with a bore 8' for receiving a follower screw 8 to be described in detail with reference to FIG. 10. Differential screw 16 for the adjustment of clamping wedge 15 is accessible from the peripheral side of the cutter head for engagement by a suitable tool.

Figure 3:
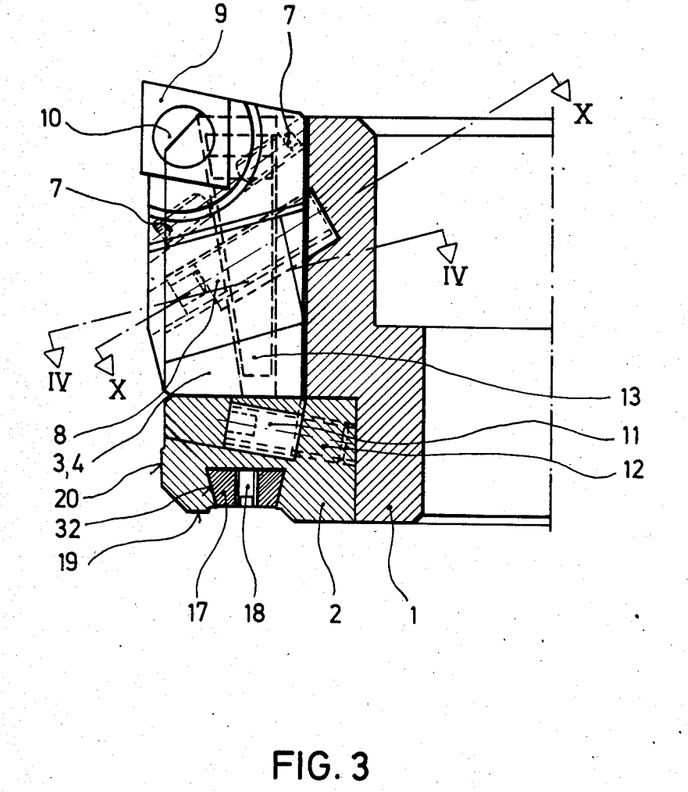
FIG. 3 shows a sectional view taken along the line III—III in FIG. 2.

FIG. 3 shows a sectional view of the cutter head on FIG. 1 taken along the line III—III in FIG. 2. In the embodiment shown, the main body is composed of a carrier 1 having an annular member 2 secured thereto. Annular member 2 may be secured by a shrink fit, although it is also possible to employ additional screws or the like to this purpose. The manner in which annular member 2 is secured to carrier 1 is not shown in detail in FIG. 3. Annular member 2 is formed with an annular groove 32 of dovetail configuration. Inserted in groove 32 is at least one balancing body 17 likewise of dovetail configuration and adapted to be secured at a predetermined position by means of a set screw 18. Displacement of balancing body 17 permits the cutter head to be dynamically equilibrated after adjustment of the cutting members. Annular member 2 is additionally provided with a peripheral control surface 20 and an annular control surface 19 at its side facing away from the cutting member. Control surfaces 19 and 20 are provided for verifying concentric rotation of the cutter head when mounted in a machine tool. Disposed below carrier member 3, 4 is an axial adjustment wedge 11 acting between carrier member 3, 4 and annular member 2. The axial adjustment wedge may be radially displaced by turnihg a differential screw 12, whereby carrier member 3, 4 is displaced in the axial direction. Differential screw 12 is received in a bore extending in axial adjustment wedge 11 and annular member 2 substantially parallel to the lower support plane of axial adjustment wedge 11. This bore is provided with screw threads both in annular member 2 and in the axial adjustment wedge. Depending on the desired effect, the two screw threads may be formed with a different pitch or in opposite directions, so that turning of differential screw 12 results in the already mentioned displacement of axial adjustment wedge 11. Also shown in FIG. 3 in phantom lines are follower screw 8, radial adjustment wedge 13 and adjustment screws 7. Radial adjustment wedge 13 may be displaced in the axial direction by means of headed screw 14 shown in FIG. 2, whereby carrier member 3, 4 is caused to be displaced in the radial direction. The exact positioning and arrangement of adjustment screws 7 is explained in detail with reference to FIG. 6. Cutting blade 9 is secured by means of fastener screw 10 to carrier member 3, 4, or cutting blade carrier 5, respectively. Follower screw 8 is received in a threaded bore of carrier member 3, 4 with its axis substantially parallel to the groove 24 shown in FIG. 2, and inclined at a predetermined angle with respect to the axis of rotation of main body 1, 2. Follower screw 8 shall be described in greater detail in connection with FIG. 10.

Figure 4:
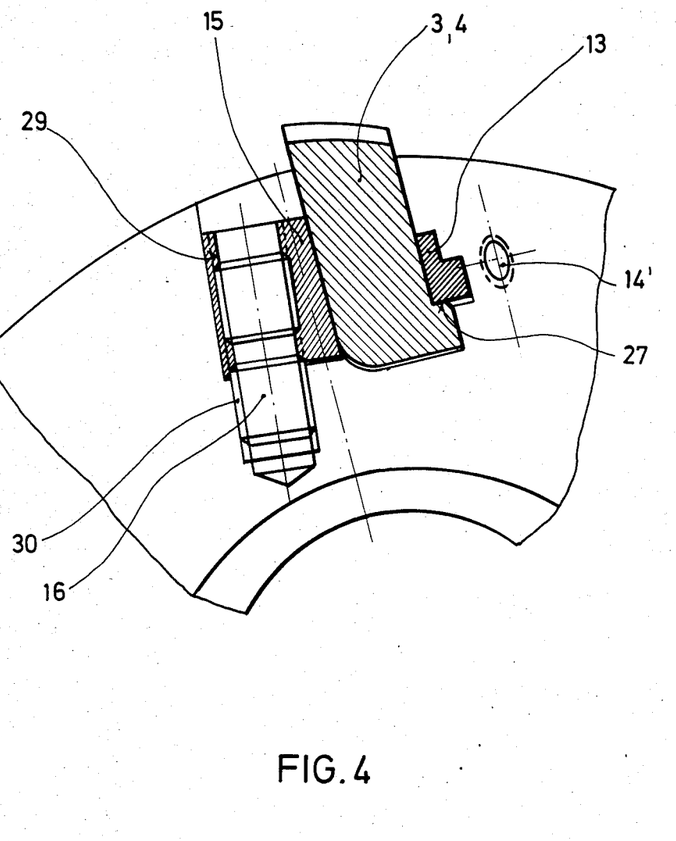
FIG. 4 shows a sectional view taken along the line IV—IV in FIG. 3 extending through the clamping wedge and the radial adjustment wedge.

FIG. 4 shows a diagrammatic sectional top plan view of clamping wedge 15 and radial adjustment wedge 13. The positioning of these two wedges has already been generally explained with reference to FIG. 1. As explained in connection with FIGS. 2 and 3, radial adjustment wedge 13 is adapted to be axially displaced by means of headed screw 14. Headed screw 14, which in FIG. 4 is not shown in detail, is received in a threaded bore 14' of main body 1, 2. As evident in connection with FIG. 3, the axis of threaded bore 14' extends parallel to the edge of the radial adjustment wedge facing towards the outer periphery and inclined with respect to the axis of rotation of the cutter head. Carrier member 3, 4 has an engagement surface 27 engaged by radial adjustment wedge 13, itself received in a corresponding groove of main body 1, 2 so as to be supported by the sidewalls of the groove. Disposed opposite radial adjustment wedge 13 is clamping wedge 15 as diagrammatically shown in FIG. 1. Clamping wedge 15 is adapted to be displaced relative to main body 1, 2 in a substantially radial direction by means of differential screw 16. To this purpose, clamping wedge 15 and main body 1, 2 are each formed with a bore provided with screw threads for engagement with differential screw 16. As descriebd in connection with FIG. 3 in the case of differential screw 12, turning of differential screw 16 results in a radial displacement of clamping wedge 15. To this purpose, the screw threads 29 provided in clamping wedge 15 may have a pitch and/or direction different from that of the screw threads 30 formed in main body 1, 2.

Figure 5:
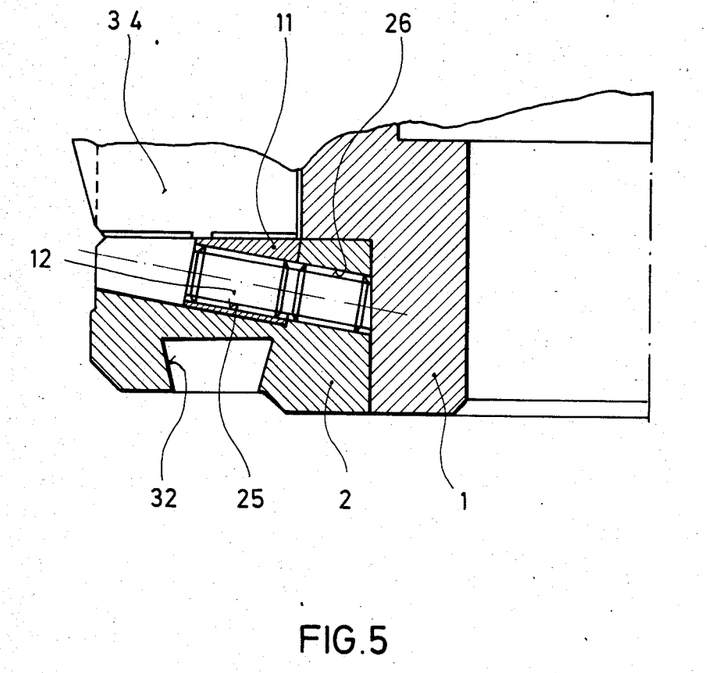
FIG. 5 shows a sectional view taken along the line V—V in FIG. 2 and extending through the axial adjustment wedge.

FIG. 5 shows a sectional view of annular member 2, carrier 1 and axial adjustment wedge 11 as taken along the line V—V in FIG. 2. Shown in particular are differential screw 12 and the bore extending through axial wedge 11 and annular member 2 and formed with different screw threads 25, 26. As already mentioned, turning of differential screw 12 results in a displacement of axial wedge 11.

Figure 6:
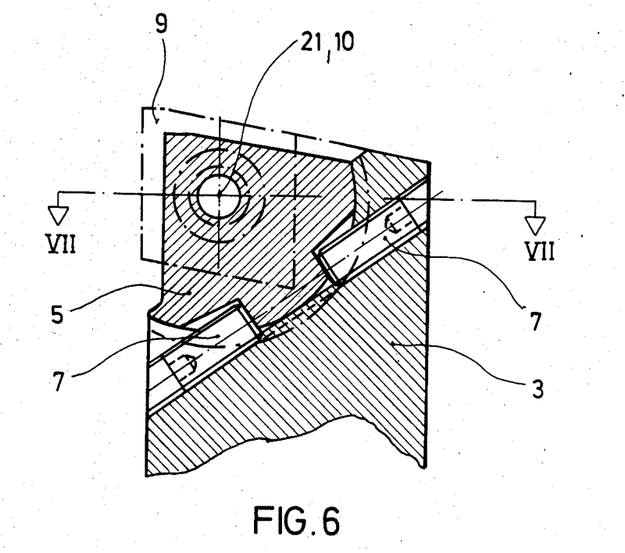
FIG. 6 shows a sectional view taken along the line VI—VI in FIG. 1.

FIG. 6 shows a sectional view of carrier member 3 and cutting blade carrier 5 as taken along the line VI—VI in FIG. 1. Cutting blade carrier 5 is connected to carrier member 3 by means of diagrammatically shown fastener screw 10 received in a bore having its axis indicated at 21. Fastener screw 10 additionally serves for securing a merely diagrammatically indicated cutting blade 9 to blade carrier 5. The side of cutting blade carrier 5 facing towards carrier member 3 is of substantially cylindrical arcuate shape centered on axis 21 of fastener screw 10. Cutting blade carrier 5 is thus rotatable relative to carrier member 3 about axis 21. Substantially tangential to the cylindrical outer surface of cutting blade carrier 5 carrier member 3 is formed with two aligned bores each receiving a respective adjustment screw 7 for engagement with cutting blade carrier 5. Turning of adjustment screws 7 is thus effective to angularly adjust cutting blade carrier 5 about axis 21.

Figure 7:
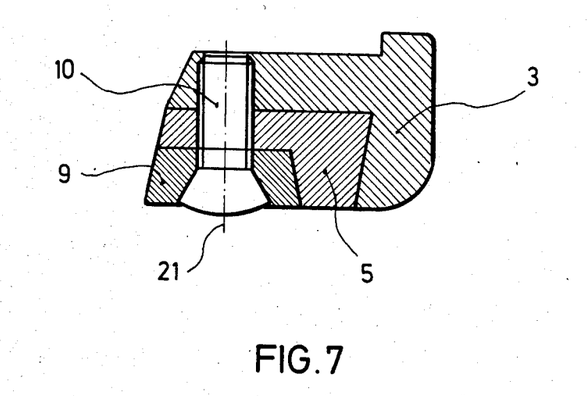
FIG. 7 shows a sectional view taken along the line VII—VII in FIG. 6.

FIG. 7 shows a sectional view of the cutting blade carrier 5 and carrier member 3 taken along the line VII—VII in FIG. 6. Shown in particular are fastener screw 10, cutting blade 9, and axis 21. The cross-sectional configuration of cutting blade carrier 5 and carrier member 3 are designed to result in an interlocked engagement preventing cutting blade carrier 5 from being displaced in the direction of axis 21.

Figure 8:
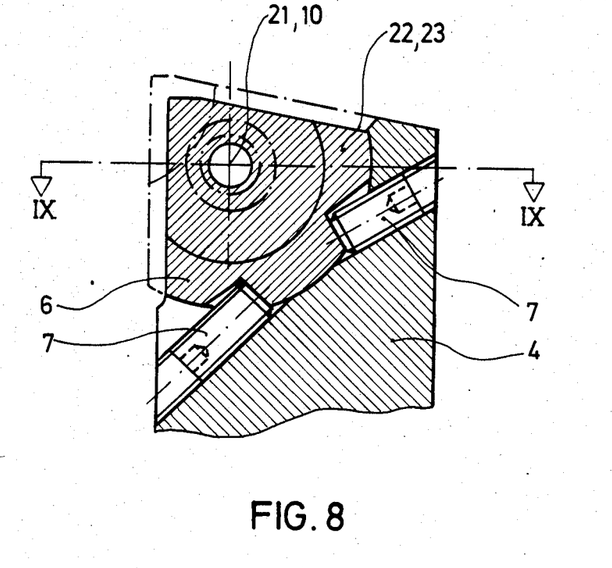
FIG. 8 shows a sectional view of another embodiment of the invention, taken along the line VIII—VIII in FIG. 1.

Shown in FIG. 8 is a cross-sectional view similar to the one shown in FIG. 6 and taken along the line VIII—VIII in FIG. 1, of a second embodiment of the cutter head according to the invention. Carrier member 4 is substantially similar to carrier member 3 shown in FIG. 6, as is the purpose and operation of adjustment screws 7. In the embodiment shown in FIG. 8, however, the axes of the two adjustment screws 7 are inclined at an angle relative to one another, resulting in an even finer adjustment to be achievable. Cutting member 6 is likewise formed with a cylindrical peripheral portion and mounted for angular displacement about axis 21 of fastener screw 10. The embodiment depicted in FIG. 8 shows a cutting member 6 for use in high-speed cutting operations. In contrast to the embodiment shown in FIG. 6, the FIG. 8 embodiment is not provided with a separate cutting blade, the cutting member 6 itself being formed of a suitable material and provided with the desired cutting edges.

Figure 9:
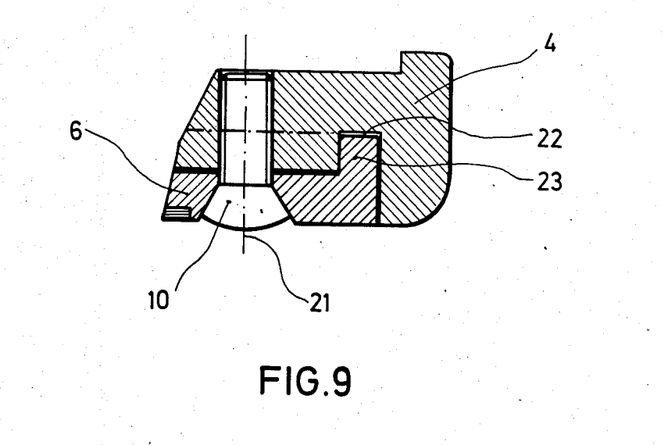
FIG. 9 shows a sectional view taken along the line IX—IX in FIG. 8.

FIG. 9 shows a cross-sectional view of carrier member 4 and cutting member 6 of FIG. 8. Cutting member 6 is provided with an arcuate bead 23 centered on axis 21 of fastener screw 10 for engagement with a substantially circular arcuate groove 22 of carrier member 4. The interlocking engagement of bead 23 with groove 22 prevents cutting member 6 from being displaced in a radial outward direction by centrifugal forces acting thereon during operation of the cutter head.

Figure 10:
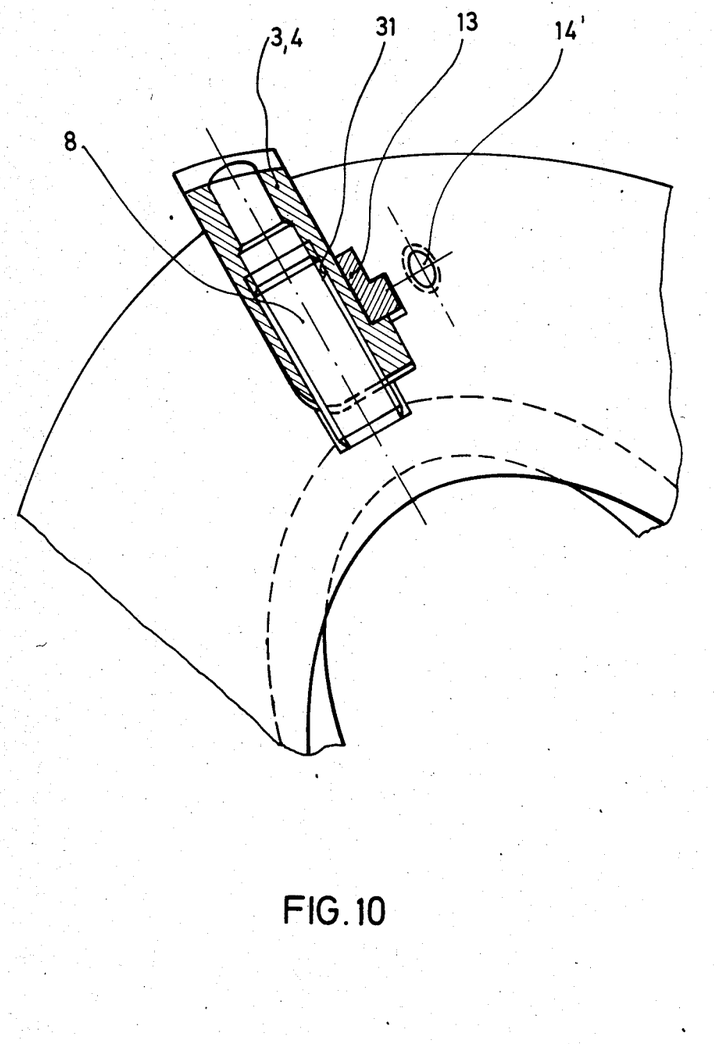
FIG. 10 shows a sectional view of the follower screw taken along the line X—X in FIG. 3.

FIG. 10 shows a sectional view of follower screw 8 and its arrangement in carrier member 3, 4, as taken along the line X—X in FIG. 3. Also shown in FIG. 10, as likewise in FIG. 4, are radial adjustment wedge 13 and threaded bore 14' for headed screw 14. Follower screw 8 is received in a threaded bore of carrier member 3, 4 and effective to bias carrier member 3, 4 in a radial direction. The bias exerted by follower screw 8 ensures that carrier member 3, 4 is always in contact with radial adjustment wedge 13.

Figure 11:
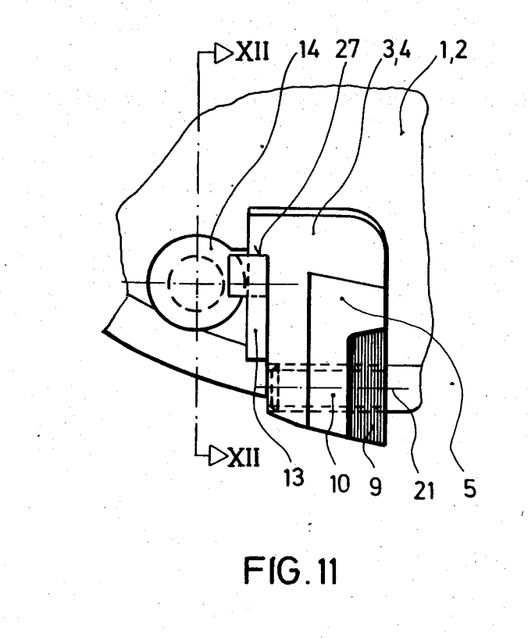
FIG. 11 shows a top plan view of the cutter head similar to FIG. 1, depicting the radial adjustment mechanism.

FIG. 11 shows a partial top plan view of the cutter head according to the invention similar to FIG. 1 for demonstrating, as in FIG. 7, the cooperation between cutting blade carrier 5, carrier member 3, 4, cutting blade 9 and fastener screw 10 in connection with radial adjustment wedge 13.

Figure 12:
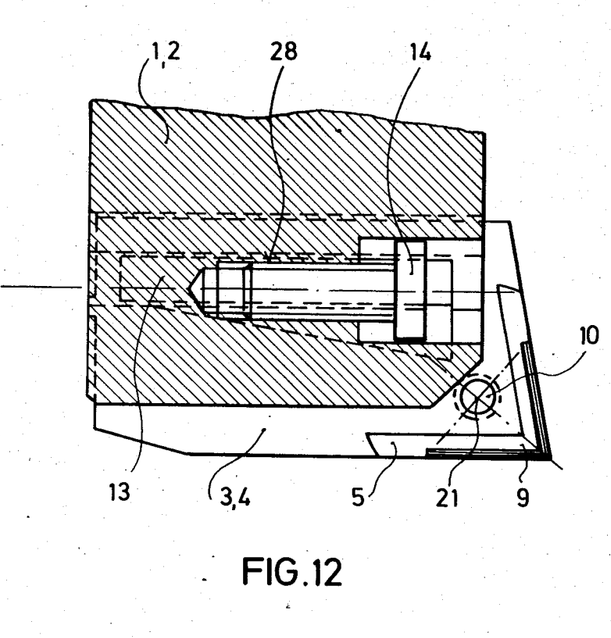
FIG. 12 shows a sectional view taken along the line XII—XII in FIG. 11.

Shown in FIG. 12 is a sectional view taken along the line XII—XII in FIG. 11 and depicting the positioning and construction of radial adjustment wedge 13 with regard to the axis of rotation of headed screw 14. The axis of rotation of headed screw 14, or of the threaded bore of main body 1, 2 receiving the headed screw, respectively, extends parallel to the rear edge of radial adjustment wedge 13.

The adjustment of the respective cutting members 5,9; 6 relative to main body 1, 2 of the cutter head for achieving coplanar or concentric rotation is carried out substantially in the following manner: In the practical execution it is recommended to carry out all of the three adjustment steps in a single operation sequence, so as to accomplish the adjustment as a whole with minimum effort and within the shortest possible time. Actuation of adjustment screws 7 results in angular displacement of cutting member 5,9; 6 so as to adjust the respective cutting member in its axial and radial position relative to carrier member 3,4. For securing cutting member 5, 6 in the thus adjusted position, the two adjustment screws 7 have to be brought into engagement with the cutting member so as to prevent further angular displacement thereof. The adjustmant of the coplanar rotation of the cutting members relative to main body 1, 2 is carried out by adjusting the position of the respective carrier members 3, 4 relative to main body 1, 2. This adjustment of the coplanar rotation preferably proceeds from the cutting edge of the cutting member projecting the greatest distance from the cutter head in the axial direction, the remaining cutting members 5, 9; 6 being adjusted to project by the same distance. The adjustment is carried out by loosening follower screw 8 and by subsequently turning differential screw 12, resulting in displacement of axial adjustment wedge 11. The direction of rotation of the differential screw depends on the type of screw threads with which it is provided. These operations are followed by retightening of the follower screw 8 and verification of the planar alignment of the cutting edge. These adjustment steps may of course be repeated whenever the position of the cutting edge relative to the cutter head has changed. The adjustment of the concentric rotation is carried out analogous to the above described procedure by proceeding from the cutting member 5,9; 6 projecting the greatest radial distance from the cutter head, the remaining cutting members being adjusted to the same projecting distance. The adjustment proper is likewise carried out by loosening follower screw 8 and by subsequently turning headed screw 14, resulting in displacement of radial adjustment wedge 13. The direction of rotation of headed screw 14 likewise depends on the type of the screw threads with which it is provided. Simultaneously with the actuation of headed screw 14, follower screw 8 is turned in a corresponding manner. As the adjustment both of the coplanar rotation and of the concentric rotation requires actuation of the follower screw 8, it is particularly advantageous to carry out both adjustments practically at the same time. Under certain conditions, the above described adjustments may be considered as a pre-adjustment phase, at the end of which the same adjustment is carried out in a final adjustment step with a slightly tightened differential screw 16. Actuation of differential screw 16 results in a displacement of clamping wedge 15 effective to secure cutting member 5,9; 6 in its adjusted position relative to main body 1,2. At the end of these adjustment procedures, the completely adjusted cutter head may be dynamically equilibrated by suitably displacing balancing body 17 in annular groove 32.

I claim:

1. A cutter head having a substantially cylindrical main body and a plurality of replaceable cutting members disposed at the periphery of said main body and having at least one cutting edge extending in the axial and/or radial direction of said main body, wherein each cutting member is mounted on a carrier member secured to said main body and adapted to be radially and axially adjusted with respect to said main body by means of separate adjustment means disposed between said main body and said carrier member, and to be fixed in position on said main body with the aid of clamping means, each carrier member being mounted in a groove extending substantially radially of the axis of rotation of said main body and having substantially parallel surfaces in the radial direction, the adjustment means for the axial adjustment of said carrier member comprising an axial adjustment wedge which is disposed on the side of said carrier member opposite to the intended axial advance direction of said main body and provided with a substantially radially extending threaded bore in alignment with a threaded bore in said main body, the two threaded bores being adapted to be threadedly engaged by a differential screw for the displacement of said axial adjustment wedge, and the adjustment means for the radial adjustment of said carrier member comprising a radial adjustment wedge which is disposed on the side of said carrier member facing away from the direction of intended rotation of said main body and adapted to be engaged with a substantially radially outwardly facing engagement surface of said carrier member, and the main body being formed with a substantially axially extending threaded bore adjacent said radial adjustment wedge adapted to be threadedly engaged by a headed screw, the bottom side of the head of said screw being adapted to be engaged with said radial adjustment wedge for displacing the radial adjustment wedge.

2. A cutter head according to claim 1, characterized in that on the side of said carrier member (3,4) opposite to said radial adjustment wedge (13) there is disposed a clamping wedge (15) formed with a threaded bore (29) extending therethrough in alignment with a threaded bore (30) of said main body (1), said threaded bores (29, 30) being adapted to receive a differential screw (16) for the displacement of said clamping wedge (15).

3. A cutter head according to claim 1, characterized in that said cutting member (5,9,6) is adapted to be secured to said carrier member (3,4) by means of a fastening screw (10) for pivotal movement about the axis (21) of said fastening screw (10) at least within a certain range, and that said pivotal movement is adapted to be limited by means of two adjustment screws (7) mounted in said carrier member (3,4).

4. A cutter head according to claim 3, characterized in that said cutting blade (9) is adapted to be secured to said cutting blade carrier (5) by means of said fastener screw (10).

5. A cutter head according to claim 1, characterized in that said carrier member (3,4) is provided with a threaded recess (31) substantially extending in a radial plane with respect to said main body (1,2) and adapted to receive a follower screw (8) for radial displacement of said carrier member (3,4) by engaging said main body (1).

6. A cutter head according to claim 1, characterized in that said cutting member (5,9) is designed in the form of a cutting blade carrier (5) carrying a cutting blade (9).

7. A cutter head according to claim 1, characterized in that said cutting member (6) is formed with a bead (23) having a radially outwards facing engagement surface and adapted to be engaged with a groove (22) of said carrier member (4) having a radially inwards facing engagement surface.

8. A cutter head according to claim 1, characterized in that the peripheral portion of said main body (1,2) is formed with an annular groove (32) adapted to have at least one balancing body (17) secured therein.

9. A cutter head according to claim 12, characterized in that said annular groove (32) is of a cross-sectional shape, and that said balancing body is formed with a dovetail profile adapted to be received in said groove, and is adapted to be secured in position by means of a fastener screw (18).

10. A cutter head according to claim 8, characterized in that said main body (1,2) is composed of a carrier (1) supporting said cutting members (5,9,6) and an annular member (2) secured to said carrier (1) and provided with said annular groove (32) and said control surfaces (19, 20).

11. A cutter head according to claim 1, characterized in that said main body (1,2) has its radial periphery provided with a annular control surface (20).

12. A cutter head according to claim 1, characterized in that said main body (1,2) has an axial end face thereof provided with an annular control surface (19).

* * * * *

UNITED STATES PATENT AND TRADEMARK OFFICE
CERTIFICATE OF CORRECTION

PATENT NO. : 4,692,069
DATED : September 8, 1987
INVENTOR(S) : Walter Kieninger

It is certified that error appears in the above-identified patent and that said Letters Patent is hereby corrected as shown below:

Column 10, line 50, after "a" insert --dovetail--.

Signed and Sealed this

Twenty-ninth Day of March, 1988

*Attest:*

DONALD J. QUIGG

*Attesting Officer*  *Commissioner of Patents and Trademarks*